Aug. 17, 1943.      R. E. REASON      2,327,289
OPTICAL TESTING OR MEASURING APPARATUS
Filed July 24, 1940      3 Sheets-Sheet 3

INVENTOR
Richard Edmund Reason
BY
Arthur L. Rice
his ATTORNEY

Patented Aug. 17, 1943

2,327,289

UNITED STATES PATENT OFFICE 2,327,289

OPTICAL TESTING OR MEASURING APPARATUS

Richard Edmund Reason, Leicester, England, assignor to Kapella Limited, Leicester, England, a company of Great Britain Application July 24, 1940, Serial No. 347,161 In Great Britain July 22, 1939

10 Claims. (Cl. 88—14)

This invention relates to optical apparatus for measuring or testing the accuracy of section profiles, especially plane section profiles, of manufactured articles or of appliances used in their manufacture, as for example for effecting precision measurement of screwthreads or hobs or thread gauges.

The primary object of the invention is to provide an improved optical apparatus of this kind, which will be applicable to the precision measurement or testing of section profiles of hollow or deeply reentrant objects, such for example as internal screwthreads or nuts. Apparatus for the examination of section profiles of hollow or deeply reentrant objects has been described in the present applicant's United States of America patent application Serial No. 345,079, filed July 12, 1940 (divisional from application Serial No. 211,231 filed June 1, 1938 which has resulted in Patent No. 2,256,102, dated September 16, 1941), and the present invention may be regarded as an improvement of such apparatus, whereby it is possible not only to effect economy both in size and in number in the optical elements used but also to extend the range of usefulness of the apparatus as regards the depth of reentrant or hole in an object which can be examined and as regards the length of the profile under examination. The invention is however of useful applicability to the examination of section profiles on the external surfaces of objects.

Figure 1:
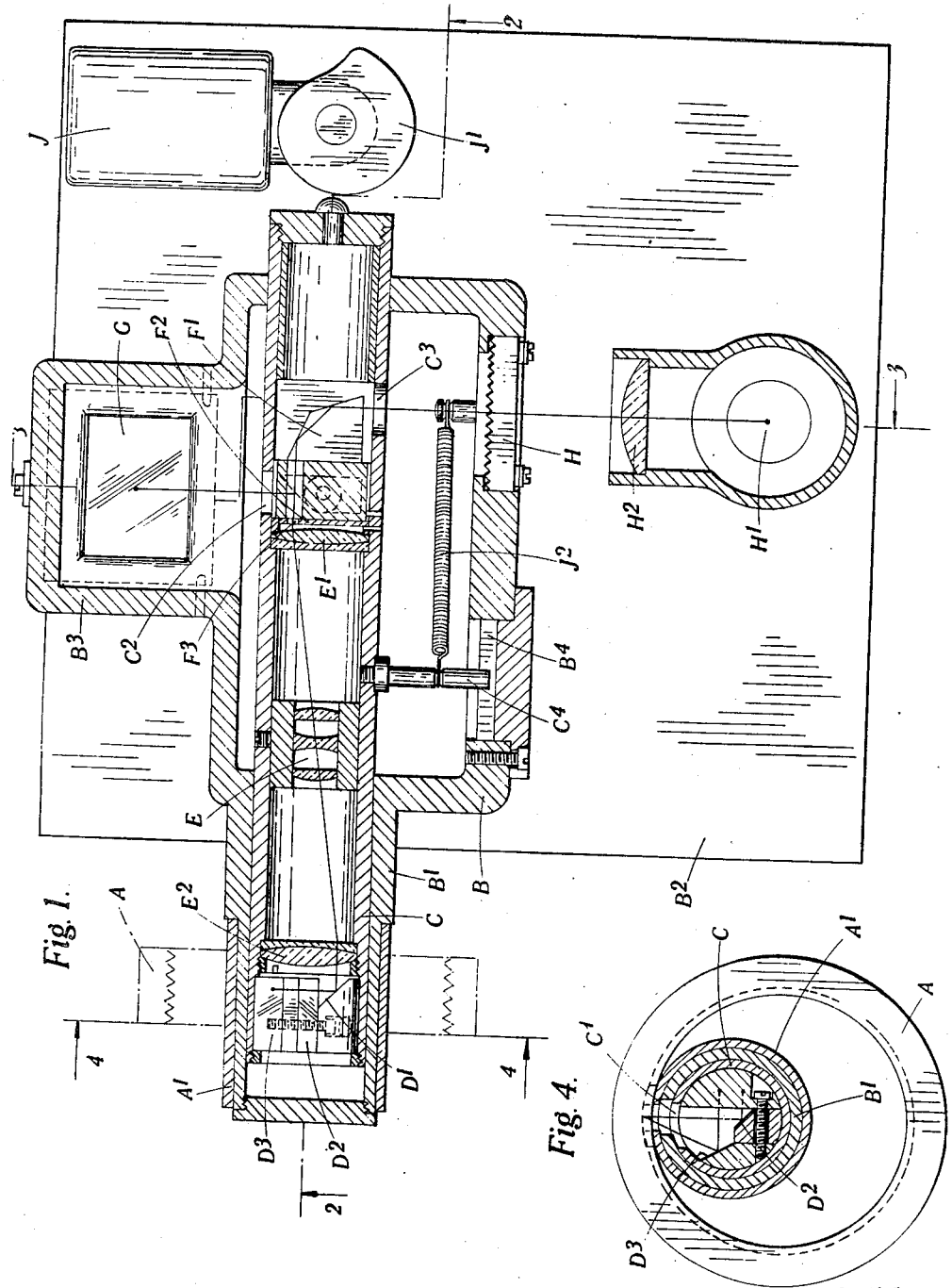
Figure 2:
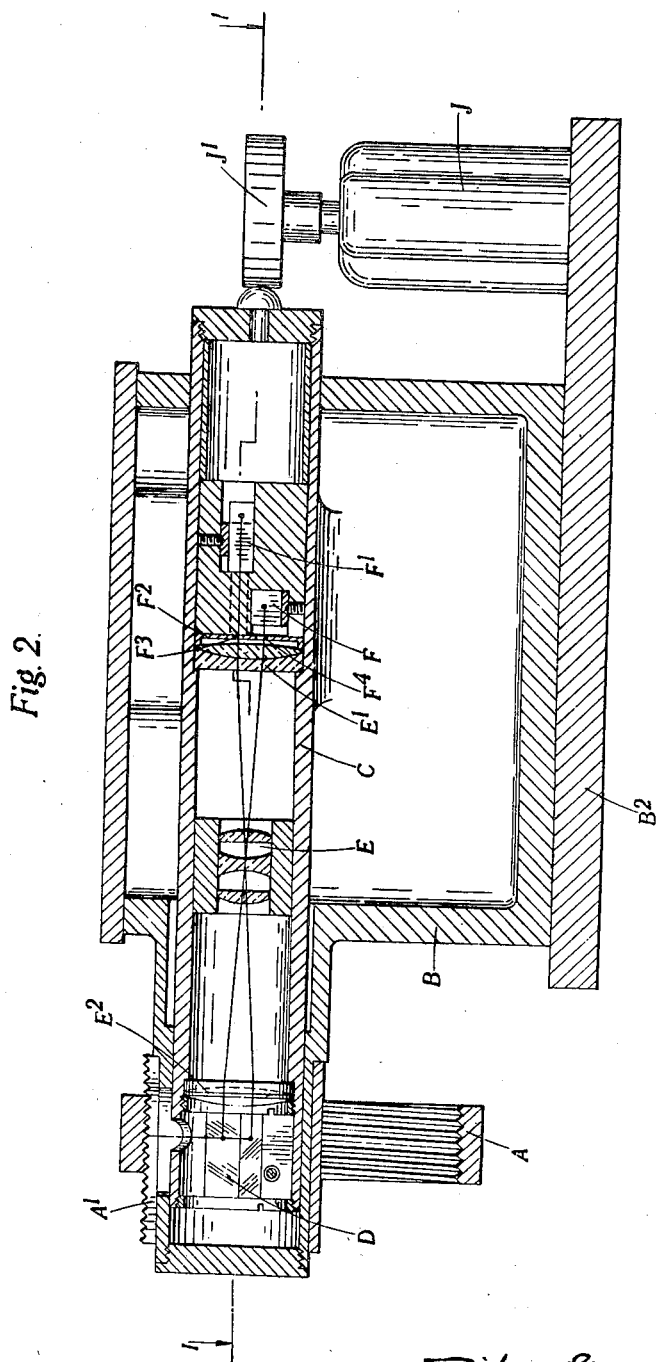
Figure 3:
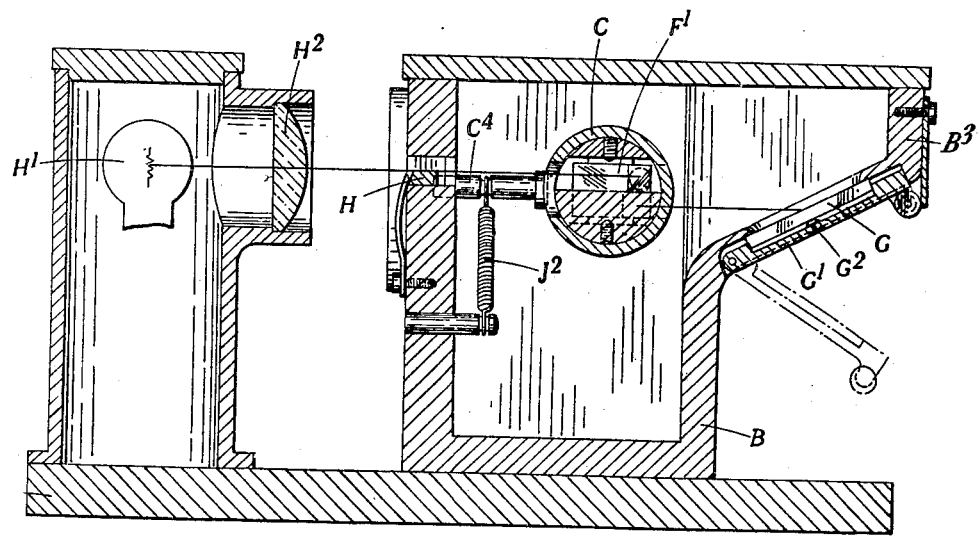

Further objects of the invention will be apparent from the appended claims and from the following description of the accompanying drawings, which show a convenient practical apparatus according to the invention. In these drawings Figure 1 is a sectional plan view of the apparatus, the section being taken on the line 1—1 of Figure 2, Figure 2 is a longitudinal vertical section on the line 2—2 of Figure 1, and Figures 3 and 4 are transverse vertical sections on the lines 3—3 and 4—4 respectively of Figure 1.

This arrangement will for convenience be described more particularly with reference to the examination of an axial plane section profile of an internal screwthread. In this arrangement the object A bearing the internal screwthread to be examined is supported on a sleeve $A^1$ detachably mounted on a lateral cylindrical extension $B^1$ of a housing B on a fixed base $B^2$. The sleeve $A^1$ is preferably screwthreaded with a pitch equal to that of the thread on the object. A cylindrical tube C is mounted to slide within the housing B and its extension $B^1$, in such a manner that the end of the tube can move within the internal screwthread with its axis parallel to that of the screwthread. The end of the tube C is cut away on its upper side at $C^1$, as also are the housing extension $B^1$ and the sleeve $A^1$, in order to provide a path for the light between the part of the screwthread to be examined and the interior of the tube C. Adjacent to such opening and within the tube is a reflector device D so arranged that illuminating rays proceeding along the tube are deflected upwards on to the screwthread to define the section profile thereon, whilst projection rays from the section profile will enter the tube and be deflected along it.

The tube C contains a lens system arranged in the manner described in the specification of the present applicant's United States of America patent application Serial No. 279,253 filed June 15, 1939 (also divisional from application Serial No. 211,231 above mentioned), and comprising a projecting lens E symmetrically disposed midway between two similar collimating lenses $E^1E^2$, whose principal focal points coincide respectively with the nodal points of the projecting lens E, the lens system being arranged to give a rectified image at unit magnification with object and image planes (or reflections thereof) inclined at equal angles to the optical axis of the system which coincides with the axis of the tube C.

The tube C also contains a reflector F for deflecting the projection rays received through the lens system $EE^1E^2$ outwards through a lateral opening $C^2$ in the tube to a photographic plate G mounted in a lateral extension $B^3$ of the fixed housing B. Another reflector $F^1$ is provided in the tube C for deflecting towards the lens system $EE^1E^2$ the illuminating rays entering the tube C through a lateral opening $C^3$ from a shaped knife edge H located in the wall of the fixed housing B.

The shaped knife edge H preferably consists of the edge of a plane section of a screw or bolt, which will mate with the internal screwthread A under examination, illuminated by means of a lamp $H^1$ and condenser $H^2$, the surface of the plane section being polished so as to make up by reflection for the loss of the part of the light which is cut off by the body of the screw or bolt. The lamp and condenser may be fixed (as shown) or may be otherwise mounted so as to illuminate the knife edge in the appropriate direction in all operative positions of the tube C. The knife edge H is disposed so that the direction of its length is generally parallel to the axis of the tube C and therefore to the longitudinal direction of the section profile to be examined, the section plane of the screw or bolt being at right angles to the plane of the section profile itself in order to suit the arrangement of the reflector devices to be described in detail below. Since the lens system $EE^1E^2$ by itself gives an inverted image, the reflector devices in the illuminating beam should be so arranged as to give a further inversion and thus to erect the image in the direction of the length of the section profile.

Thus for illuminating purposes the principal rays proceed from the knife edge H at right angles to the axis of the tube C and are reflected at $F^1$ in a direction parallel to such axis and at one side thereof to the first collimating lens $E^1$ of the lens system. These rays emerge from the second collimating lens $E^2$, again parallel to the tube axis but at the same distance on the other side thereof. After leaving the second collimating lens $E^2$ the rays are incident on the first reflecting surface $D^1$ of the reflector device D at the end of the tube C. This surface $D^1$ lies at right angles to the plane of the knife edge H and at 45° to the tube axis, so that the principal illuminating rays are reflected towards the axis (but below it), where they are incident on the second reflecting surface $D^2$ of the reflector device D. This second surface $D^2$ is at an angle of 45° to the plane of the knife edge H and intersects such plane in a line parallel to the tube axis, so that the principal illuminating rays are reflected upwards at right angles to the plane of the knife edge through the opening $C^1$ cut away in the end of the tube C on to the surface of the screw-thread A itself to define the section profile thereon, the rays at this point being wholly confined to the section plane at right angles to the knife edge plane. The knife edge H is so positioned relatively to the screwthread that the lens system $EE^1E^2$ acts in all positions of the tube C accurately to focus part of the knife edge on the corresponding part of the screw-thread, and the arrangement is such that one side of the section profile is illuminated and the other side is dark, the profile being defined by the separating edge between the light and dark areas.

The principal rays used for projection of the image leave the section profile obliquely at an angle of, say, 30° to the section plane and are incident on the third reflecting surface $D^3$ of the reflector device D, this surface being inclined to the section plane at an angle of 30° and intersecting such plane in a line parallel to the tube axis. Thus after reflection at this surface $D^3$ the principal projection rays proceed at right angles to the section plane and are incident on the first reflecting surface $D^1$ of the reflector device D, which reflects them parallel to the tube axis towards the second collimating lens $E^2$ of the lens system. It will be clear that the field of the illuminating beam occupies only a small portion of the surface of this collimating lens $E^2$ and that of the projection beam another small portion of such surface, the two portions both being located to one side of the section plane. The two fields are likewise confined to small portions of the surface of the first collimating lens $E^1$, but on the opposite side of the section plane, and a mask $F^2$ having two apertures $F^3F^4$ respectively embracing the two fields is disposed in the tube adjacent to the first collimating lens $E^1$ (on the side thereof remote from the other elements of the lens system) in order to segregate the illuminating and projection beams from one another and to minimize disturbance of the projected image by "ghost" reflections from the various lens surfaces. The principal projection rays emerge from the first collimating lens $E^1$ in a direction parallel to the tube axis and after passing through the appropriate mask aperture $F^4$ are reflected at F at right angles to the section plane through the lateral opening $C^2$ in the tube wall on to the photographic plate G in the fixed housing. The plate G is inclined at 60° to the section plane and intersects such plane in a line parallel to the tube axis, its position being such that the image surface is conjugate to the section plane with respect to the lens system in all positions of the tube.

Thus an accurately focussed and rectified image of the section profile will be projected on to the photographic plate G, and in any one position of the tube C the particular portion of the section profile which is illuminated will be imaged on the plate. Movement of the tube C will cause a different portion of the profile to be illuminated, and the image of such portion will be in the appropriate position on the plate G relatively to that of the original portion, so that by movement of the tube a complete image of the whole section profile for any desired length thereof will be obtained on the plate. The tube C can be moved step by step from one position to another, with separate exposures of the plate G in the individual positions, or alternatively the tube can be driven at a slow speed, for example by an electric motor J through suitable gearing, to give the desired complete image, the speed of drive being chosen to suit the sensitivity of the emulsion on the plate G so as to give the proper exposure for each portion of the profile. In the example shown the motor J drives a cam $J^1$, against which the end of the tube C is pressed by means of a spring $J^2$, a straight guide slot $B^4$ being provided in the wall of the housing B in which a pin $C^4$ carried by the tube C engages. For removal of the plate G a hinged door $G^1$ is provided in the wall of the housing extension $B^3$, and to ensure correct positioning of the plate when the door is closed, a button $G^2$ carried by the door presses the plate against a facing on the wall of the extension $B^3$.

It will be appreciated that with this arrangement it is possible to obtain a satisfactory photograph of a considerable length of a section profile on an internal surface of a reentrant or hollow object, provided that the hole in the object is large enough to receive the tube, the only limitation to the length of profile photographed and to its depth beneath the external surface of the object being that determined by the focal length of the lens system.

It is to be understood that the invention, although more especially intended for use in the examination of internal or reentrant surfaces, is not wholly limited thereto and may be applied with appropriate modification to the examination of external surfaces.

What I claim as my invention and desire to secure by Letters Patent is:

1. Optical apparatus for measuring or testing the accuracy of plane section profiles of hollow or deeply reentrant objects, comprising a lens system so arranged as to collimate the principal rays in its object and image spaces and having its optical axis substantially parallel to the length of the section profile to be examined, reflecting means disposed between the lens system and the section profile, a generally tubular casing housing the lens system and the reflecting means and having a lateral opening between the reflecting means and the section profile, an illuminating device incorporating the lens system and acting to direct a beam of light bounded, at least on one side, by a plane in a direction substantially parallel to the optical axis of the lens system on to the reflecting means and thence through the lateral opening on to an internal or reentrant surface of the object to define the section profile thereon, and an optical projecting device also incorporating the lens system and acting by means of a beam of light proceeding from the section profile obliquely to the section plane on to the reflecting means and thence to the lens system in a direction substantially parallel to the optical axis thereof to project on to an image plane disposed obliquely to the projected beam of light a rectified image of the section profile free from distortion due to the oblique projection, the reflecting means comprising three reflecting surfaces of which the first receives the illuminating beam from the lens system and deflects it transversely on to the second surface which again deflects it substantially radially through the lateral opening, the reflected bounding plane of the illuminating beam coinciding with the section plane of the profile, whilst the third surface receives the oblique projecting beam from the section profile and deflects it transversely on to the first surface whence it is again deflected longitudinally towards the lens system.

2. Optical apparatus for measuring or testing the accuracy of plane section profiles of hollow or deeply reentrant objects, comprising a lens system so arranged as to collimate the principal rays in its object and image spaces and having its optical axis substantially parallel to the length of the section profile to be examined, reflecting means disposed between the lens system and the section profile, a generally tubular casing housing the lens system and the reflecting means and having a lateral opening between the reflecting means and the section profile, a source of light, a knife edge illuminated by the source and shaped to correspond closely to the shape of the section profile and so located that the lens system with the aid of the reflecting means acts to focus an image of the knife edge on an internal or reentrant surface of the object and thereby to define the section profile thereon, an image-receiving surface, the lens system acting to receive from the reflecting means a beam of light proceeding from the section profile obliquely to the section plane and to project on to the image surface a rectified image of the profile, the image receiving surface being so located as to compensate for distortion due to the oblique projection, and means whereby the illuminating and projecting beams lie substantially parallel to one another and are segregated from one another in the object and image spaces of the lens system.

3. Optical apparatus as claimed in claim 1, in which the lens system common to the illuminating and projecting devices comprises a projecting lens, and two collimating lenses which are disposed symmetrically one on either side of the projecting lens and whose principal focal points respectively coincide with the nodal points of the projecting lens.

4. Optical apparatus as set forth in claim 2 in which a two-apertured mask adjacent to the lens system acts as the means to segregate the illuminating rays from the projection rays and thereby to minimize disturbance of the projected image by ghost reflections.

5. Optical apparatus for measuring or testing the accuracy of plane section profiles, comprising a housing, a work support carried by the housing for supporting the object to be examined, means providing an image-receiving surface mounted on the housing, reflecting means in the housing, an illuminating device by means of which a beam of light bounded, at least on one side, by a plane is directed with the aid of the reflecting means on to the surface of the object under examination, an optical projecting device in the housing by means of which the diffused light from the surface of the object is utilised with the aid of the reflecting means for the projection of an image of the profile of the section in which the object is cut by such bounding plane, and means for imparting translational movement relatively to the object in the direction of the length of the section profile to at least part of the complete optical system constituted by the reflecting means and the optical elements of the illuminating and projecting devices whereby different parts of the section profile are brought in turn into the operative field of such optical system.

6. The combination with the features set forth in claim 2, of means whereby the reflecting means and the lens system can be moved relatively to the object in such a manner that different parts of the section profile are brought in turn into the operative field of the lens system.

7. The combination with the features set forth in claim 1, of means whereby the reflecting means can be moved relatively to the object along the length of the section profile.

8. Optical apparatus as claimed in claim 1, in which the illuminating device comprises in addition to the lens system, a knife edge shaped to correspond closely to the shape of the section profile, and means for illuminating the knife edge, the lens system acting with the aid of the reflecting means to focus an image of the knife edge on the surface of the object to define the section profile thereon.

9. Optical apparatus for measuring or testing the accuracy of plane section profiles, comprising a knife edge shaped to correspond closely to the shape of the section profile of the object under examination, means for illuminating the knife edge, an image-receiving surface, reflectors adjacent to the section profile, further reflectors adjacent to the knife edge and to the image surface, a lens system interposed between the two sets of reflectors and so arranged as to collimate the principal rays in its object and image spaces and acting with the aid of the reflectors both to focus an image of the knife edge on to the surface of the object to define the section profile thereon and to receive rays proceeding obliquely from the section profile for projecting on to the image surface a rectified image of the profile free from distortion due to the oblique projection, and means whereby the lens system and the reflectors can be moved relatively to the object in the direction of the length of the profile, the knife edge and the image surface being stationary relatively to the object and lying substantially parallel to the length of the section profile.

10. Optical apparatus for measuring or testing the accuracy of plane section profiles, comprising a fixed base, a housing on the base, a work support carried by the housing for supporting the object to be examined, a knife edge mounted in the housing and shaped to correspond closely to the shape of the section profile of the object, means for illuminating the knife edge, an image-receiving surface mounted in the housing, reflectors adjacent to the work support, further reflectors adjacent to the knife edge and to the image surface, a lens system interposed between the two sets of reflectors and acting with the aid of the reflectors both to focus an image of the knife edge on to the surface of the object to define the section profile thereon and to project an image of the profile on to the image surface, a tube containing the lens system and the reflectors and apertured to permit passage of the light from the knife edge through the lens system to the object surface and from the object surface back through the lens system to the image surface, and means whereby the tube can be moved longitudinally in the housing in a direction of the length of the section profile.

RICHARD EDMUND REASON.